(12) United States Patent  
Boesser et al.

(10) Patent No.: US 7,982,950 B2
(45) Date of Patent: Jul. 19, 2011

(54) MEASURING SYSTEM FOR STRUCTURES ON A SUBSTRATE FOR SEMICONDUCTOR MANUFACTURE

(75) Inventors: Hans-Artur Boesser, Breidenbach (DE); Walter Steinberg, Weilmuenster-Moettau (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 478 days.

(21) Appl. No.: 12/113,227

(22) Filed: May 1, 2008

(65) Prior Publication Data

US 2008/0278790 A1  Nov. 13, 2008

(30) Foreign Application Priority Data

May 7, 2007 (DE) .......................... 10 2007 021 823

(51) Int. Cl.
*G02B 21/06* (2006.01)
*G02B 21/00* (2006.01)

(52) U.S. Cl. .......................... 359/388; 359/368; 359/385
(58) Field of Classification Search .......... 359/368–390, 359/227–234, 738–740
See application file for complete search history.

(56) References Cited

U.S. PATENT DOCUMENTS

| | | | | |
|---|---|---|---|---|
| 5,684,626 A * | 11/1997 | Greenberg | .................... | 359/388 |
| 6,015,644 A | 1/2000 | Cirelli et al. | | |
| 6,396,628 B1 * | 5/2002 | Osa et al. | ....................... | 359/385 |
| 6,822,740 B2 * | 11/2004 | Nomura | ......................... | 356/401 |
| 6,891,671 B1 * | 5/2005 | Greenberg | .................... | 359/388 |
| 2007/0024966 A1 * | 2/2007 | Yamazaki et al. | ............. | 359/385 |

* cited by examiner

*Primary Examiner* — Thong Nguyen
(74) *Attorney, Agent, or Firm* — Houston Eliseeva, LLP

(57) ABSTRACT

A measuring system is disclosed with enhanced resolution for periodic structures on a substrate for semiconductor manufacture. Aperture structures of varying geometries are provided in the illumination beam path. The aperture structures differ regarding the transmission characteristics of light, and which adjust the intensity distribution of the diffraction orders in the imaging pupil of the optical system.

8 Claims, 5 Drawing Sheets

MEASURING SYSTEM FOR STRUCTURES ON A SUBSTRATE FOR SEMICONDUCTOR MANUFACTURE

RELATED APPLICATIONS

This application claims priority to German Patent Application No. 10 2007 021 823.2, filed on May 7, 2007, which is incorporated herein by reference in its entirety.

FIELD OF THE INVENTION

The present invention relates to a measuring apparatus with enhanced resolution for measuring periodic structures on a substrate for semiconductor manufacture. The measuring system comprises a condenser with an entrance pupil.

The present invention further relates to the utilization of various apertures or aperture structures in the illumination beam path of a measuring system for measuring periodic structures on a substrate for semiconductor manufacture.

BACKGROUND OF THE INVENTION

European Patent EP 0 938 031 B1 discloses a method for the manufacture of integrated circuits using an aperture with variable transmission. Herein, an aperture comprises areas of varying transmission. The method and device proposed here are not suitable for use in a measuring system which measures the position and/or the dimension of structures on a substrate.

SUMMARY OF THE INVENTION

It is an object of the present invention to provide a measuring system with enhanced resolution for measuring certain periodic structures on a substrate for semiconductor manufacture.

The present object is solved by a measuring system comprising a condenser with an entrance pupil, wherein the condenser can be configured as a measuring objective and aperture structures provided in an illumination beam path, for changing the distribution of the intensities of the orders of diffraction in an imaging beam path.

It is a further object of the present invention to utilize an aperture structure in the measuring system in such a way that enhanced resolution can be achieved in the inspection of periodic structures on a substrate for semiconductor manufacture.

The above object is solved by the use of an aperture structure in a measuring system for periodic structures on a substrate for semiconductor manufacture. The measuring system has a condenser with an entrance pupil and an aperture structure is provided in the entrance pupil of the condenser.

The present invention is advantageous in that it provides enhanced resolution for periodic structures on a substrate for semiconductor manufacture. The measuring apparatus comprises a condenser with an entrance pupil. The measuring light is focused onto the structure to be measured through the condenser, which can be formed as the actual measuring lens, at various angles determined by the aperture of the condenser and the illumination source. The diffraction of light on the periodic structure generates an intensity distribution of the diffraction orders in the pupil of the imaging optics. This intensity distribution is dependent both on the structure and on the angle of incidence. It goes without saying for a person skilled in the art that the intensities are dependent on the aperture of the lens. This ultimately defines the order of diffraction at which diffracted light can be captured by the imaging beam path (simply illustrated e.g. in the case of vertical incidence of light in FIG. 4A). It is precisely this insufficient supply of light of a diffraction order greater than zero in the pupil, that leads to inadequate resolution.

An annular aperture structure is, for example, arranged in the entrance pupil of the condenser. The annular aperture structure comprises a circular inner area and an annular outer area, which differ according to the transmission characteristics of the light. Further known aperture types are described in various other publications as annular, dipolar, quasar or quadrupole apertures. In other publications, the illumination means is also often referred to as off axis illumination. Common to all, is that the intensity distributions of the different diffraction orders are changed in the imaging pupil, resulting in the enhanced resolution of the imaged structures. Well known from microscopy is the dependency of contrast (steep edges) on the diameter of the aperture stop.

The imaging process can be simply described in an exemplary manner, wherein diffracted beams interact with the edges of the transilluminated structure and carry information not only about the edges but also about the structure itself. The less information available for image creation (small aperture) or the more undiffracted light or scattered light that overlaps this portion, then the more blurred the edges become and resolution declines.

In one embodiment the circular inner area of the aperture can be opaque while the annular outer area is then transparent. In this way the intensity ratio of the $0^{th}$ and $\pm 1^{st}$ diffraction order is modified in favor of the $\pm 1^{st}$ order thus enhancing resolution.

In a further embodiment, the transmission characteristic of the circular inner area declines toward the center in accordance with a function. The annular outer area is likewise transparent. The function describing the decline of transmission toward the center of the circular inner area can, for example, be a cosine function.

A further configuration of the aperture structure consists in a variable configuration of the diameter of the circular inner area and the width of the annular outer area. An LCD array structure, for example, can be used for the variable configuration of the annular aperture structure, wherein transmission for the individual arrays can be set. Alternatively it is also possible, for example, to pivot in on a mechanical slide or turret various fixed annular or circular apertures of varying transmission ranges. Depending on the periodic arrangement of the structures on the substrate for semiconductor manufacture, it is thus possible to select a aperture setting suitable to achieve enhanced resolution.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
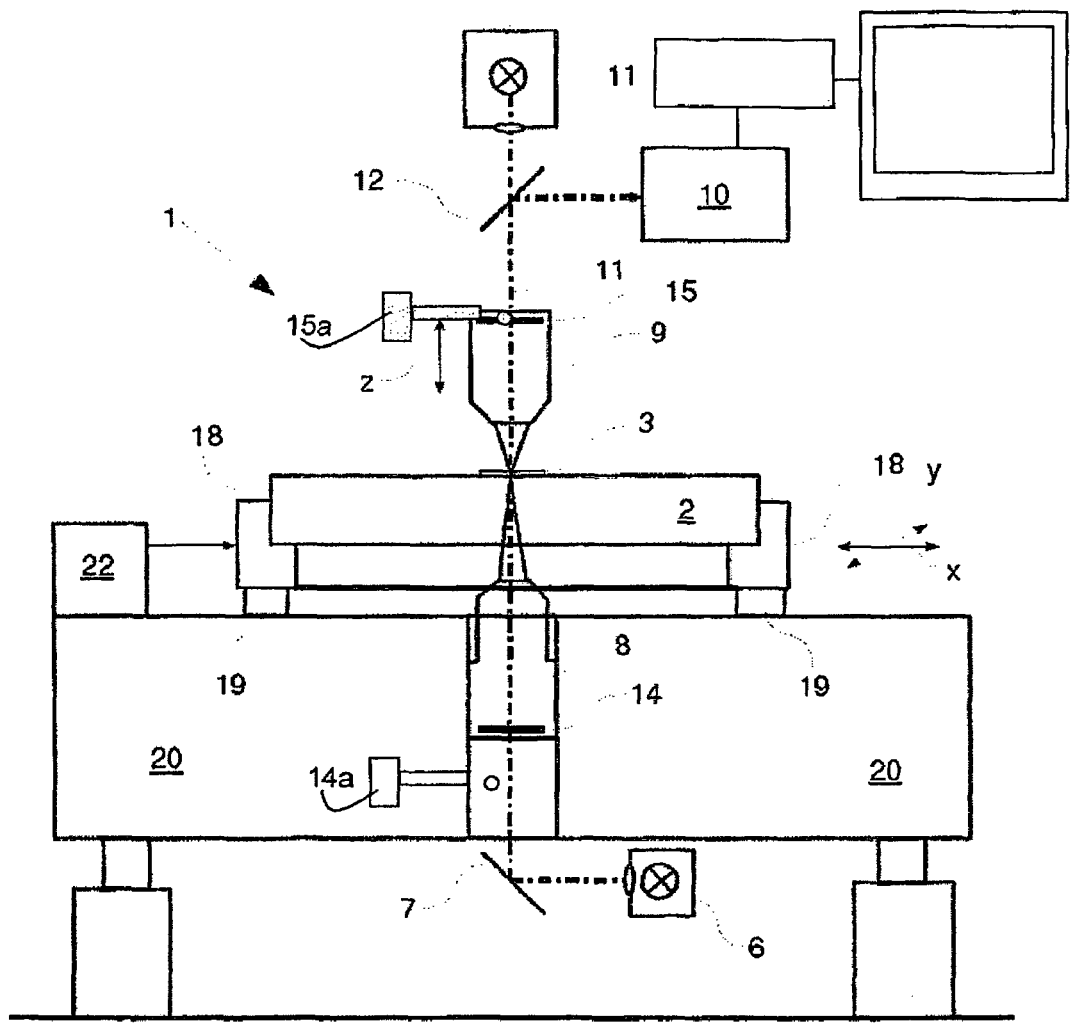
FIG. 1 schematically shows a coordinate measuring device according to the prior art for measuring the position and/or dimension of structures on a substrate.

A coordinate measuring device of the type shown in FIG. 1, is an arrangement known from the state of the art, used also for measuring structures with a high measuring accuracy. The coordinate measuring device is an example of a device group used for measuring structures 3 on a substrate 2. In the case of measuring device 1, the actual measuring device itself is mounted on a vibration-damped granite block 20. The masks or wafers are placed on the measuring stage 18 by an automatic handling system. This measuring stage 18 is supported on the surface of granite block 20 by air bearings 19. Measuring stage 18 is motor driven and displaceable in two dimensions (X coordinate direction/Y coordinate direction). The corresponding driving elements are not shown. Planar mirrors are mounted on two mutually perpendicular sides of measuring stage 18. A laser interferometer system 22 is used to track the position of measuring stage 18.

Illumination and imaging of the structures to be measured is carried out using a high-resolution microscope optics with incident light and/or transmitted light. A CCD camera serves as a detector. Measuring signals are obtained from the pixel, positioned within a measuring window, of the CCD detector array. An intensity profile of the measured structure is derived therefrom by means of image processing, for example, for determining the edge position and width of the structure or the intersection point of two structures intersecting each other. Usually the positions of such structural elements are determined relative to a reference point on the substrate (mask or wafer). Together with the interferometrically measured position of measuring stage 18, the coordinates of structure 3 can be derived herefrom. The structures on the wafers or masks used for exposure of the wafers only allow extremely small tolerances. Thus, to inspect these structures, extremely high measuring accuracies (currently in the order of nanometers) are required. A method and a measuring device for determining the position of such structures is known from German Patent Application Publication DE 100 47 211 A1. For details of the above position determination explicit reference is made to that document.

In the example of measuring device 1, illustrated in FIG. 1, measuring stage 18 is formed as a frame so that sample 3 can also be illuminated with transmitted light from below. Above sample 3 is a further illumination (13) and imaging device (objective 9, mirror 12, tube lens 10), which is arranged about an optical axis 11. The objective displaceable in the Z coordinate direction is indicated with reference numeral 9. Reference numerals 14 and 15 indicate, for example, positions at which one or more apertures or aperture structures can be arranged. Advantageously, the form and transmission characteristics of the apertures can be automatically configured and set. By means of a motor-driven slide or turret 14a, 15a the apertures can be advantageously exchanged. Additionally a comparison of measurements carried out with different aperture forms is also advantageous.

A transmitted-light illumination means with a height-adjustable condenser 8 and a light source 6 is also used in granite block 20.

Figure 2:
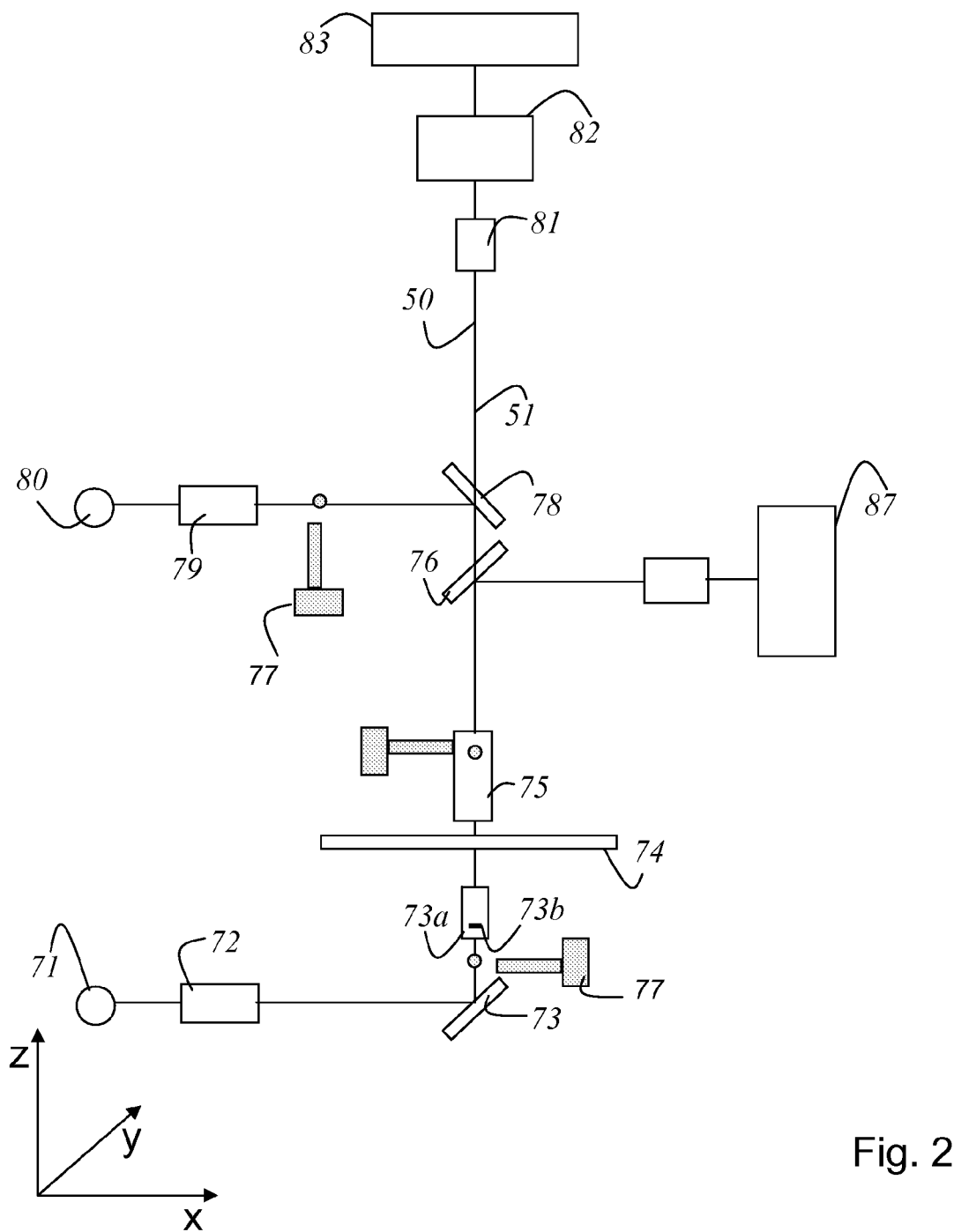
FIG. 2 shows a schematic arrangement of a microscope stand for incident light and transmitted light.

FIG. 2 schematically shows an incident-light and transmitted-light arrangement, as used for microscope stands. The arrangement also comprises a transmitted-light lamp housing 71, that directs light via collector 72 to mirror 73, which then reflects the light via condenser 73a with entrance pupil 73b, onto substrate 74 bearing the varying structures. Further, an incident-light illumination means 80 is provided which also couples-in light via an incident-light collector 79 by means of an incident-light coupling-in mirror 78 (not shown in drawings) into optical axis 51, or illumination beam path 50 of the optical system. A lens 75 is provided above substrate 74 for imaging the light of incident-light illumination means 80 onto the substrate and collects the light of transmitted-light illumination means 71 and/or of incident-light illumination means emitted by substrate 74 and ultimately images it onto detector 83, which can be either a camera, a scanner or a line scanner. Additionally, the optical system is provided with a focusing system 87, the measuring light of which is likewise coupled into optical axis 51 of the optical system via beam splitting mirror 76. The incident light and transmitted light collected by lens 75 passes through the various beam splitters in the illumination beam path and is directed via a tube lens optics 81 and, if necessary, an additional optics 82 to detector 83. The adjustable, motor-driven apertures 77 can be in various embodiments, e.g. can be either a slide or a turret. The structures on the substrate 74 may be illuminated using a coherent illumination.

Figure 3:
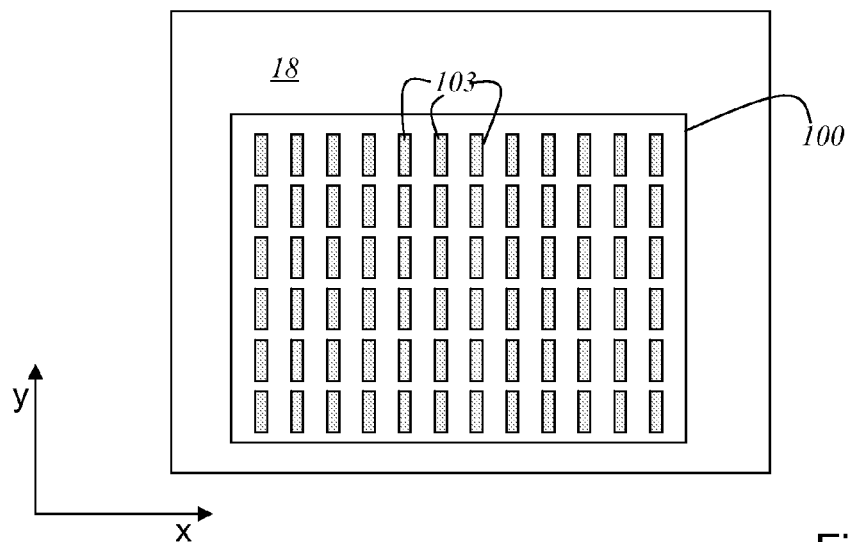
FIG. 3 shows a schematic view of a substrate on which periodic structures are deposited.

FIG. 3 shows a schematic view of a substrate 100, on which numerous structures 103 are periodically arranged. The substrate 100 is located on a stage 18 moveable in X/Y coordinate directions. It is obvious to a person skilled in the art that the structures 103 in FIG. 3 are not to be regarded as limiting. The shape of the structures is not restricted to an elongate form.

Figure 4A:
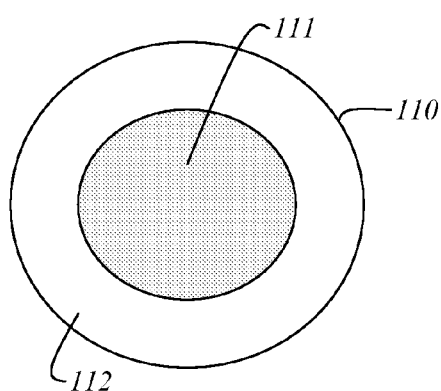
FIG. 4A shows a schematic representation of an aperture structure comprising an inner area and an outer area, which differ with respect to transmission.

FIG. 4A shows a schematic view of the annular aperture structure 110, comprising an inner circular area 111 and an outer annular area 112. The aperture structure depicted in FIG. 4A, can be brought, for example, into the entrance pupil of the condenser, effectively enhancing the resolution and contrast of periodic structures. The depth of focus for periodic structures is improved simultaneously, which additionally enhances the reproducibility of the measuring results. In the embodiment shown in FIG. 4, the inner circular area 111 is opaque while the outer annular area 112 is transparent in this case.

Figure 4B:
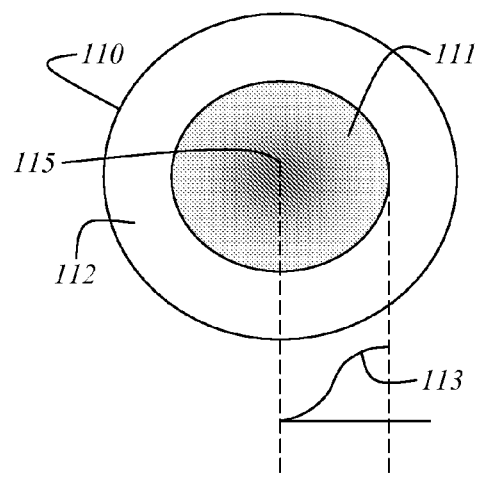
FIG. 4B shows a schematic view of an aperture structure comprising a transparent outer area and an inner area, wherein the inner area exhibits a transmission gradient.

A further embodiment of the aperture structure according to the present invention is shown in FIG. 4B. The outer annular area 112 is likewise completely transparent. The inner circular area 111 is formed in such a way that transmission declines toward the center 115 of the aperture structure 110. The transmission of the circular inner area declines in accordance with a cosine function 113. Even in this case, an enhancement of resolution and an increase in the depth of focus can be realized for certain periodic structures. Possible fields of application are, in particular, the measurement of critical dimensions (CD) on wafers and reticle structures, as well as all optical inspection procedures reliant on optimized resolution.

Figure 4C:
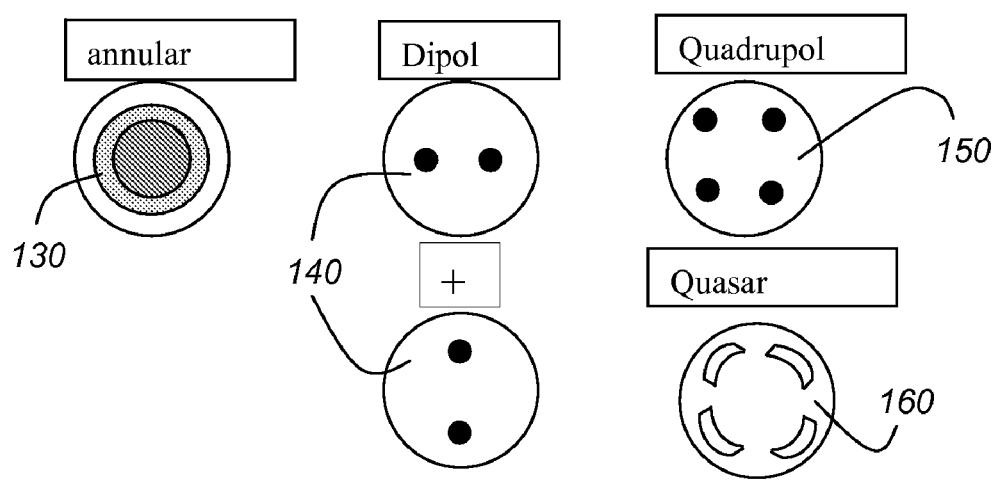
FIG. 4C shows a schematic representation of various other aperture forms, the marked areas of which differ with respect to transmission.

FIG. 4C shows a schematic representation of various other forms of apertures, wherein marked areas vary in transmission. One possible aperture structure is an annular aperture 160. It is further possible, to use a dipole 140 as an aperture structure, wherein the dipole can be arranged in varying orientations. Yet another alternative aperture structure is a quadrupole 150. A quasar 160 is also conceivable as an aperture structure.

It is also conceivable that the annular aperture structure 110 is formed as a driveable LCD. This has the advantage that the aperture structure can be adjusted freely. As a result, the diameter of the circular inner area 111 and the annular outer area can be adjusted at any time without difficulty in accordance with the structures to be inspected and their periodicity.

Figure 5A:
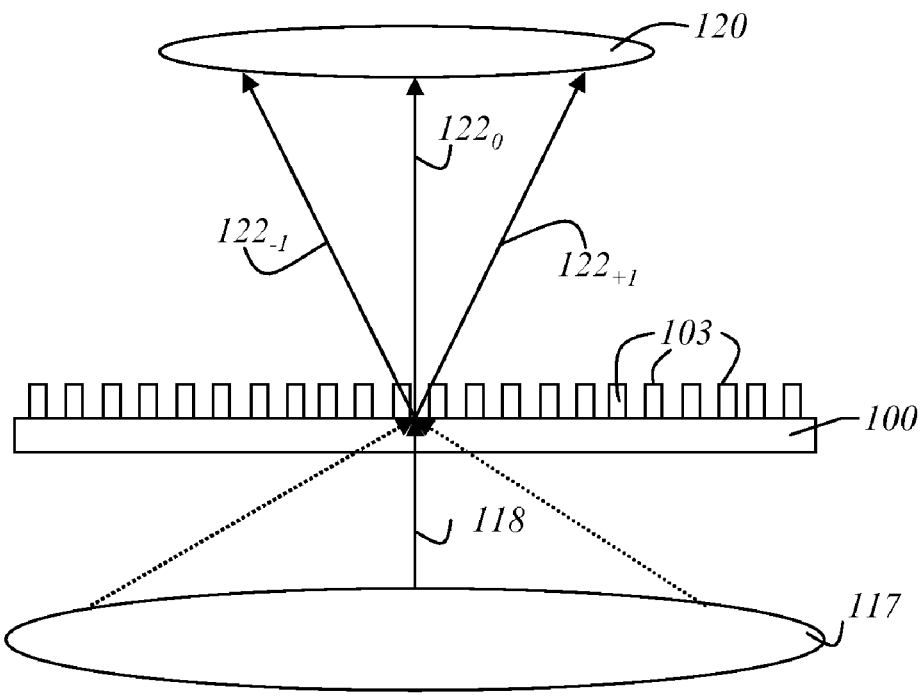
FIG. 5A schematically shows the illumination of a substrate with periodic structures arranged on it, whereby illumination is perpendicular to the substrate.

Since the aperture structure 110 is variable, the width of the transparent outer area 112 can be selected, in accordance with the illumination mode, to achieve optimized resolution. FIG. 5A is an idealized illustration of an illumination of substrate 100 with light beam 118, directed from condenser 117 at right angles onto substrate 100. Providing the aperture of the lens 120 is adequate, the $0^{th}$ and $\pm 1^{st}$ order will contribute to the image. The intensities of the orders vary. A decreasing distance between the structures or the size reduction of the structures themselves, result in an enlargement of the angle between the $0^{th}$ and $1^{st}$ order. If the $1^{st}$ order cannot be captured by the lens, resolution declines and the structures in the image merge together.

Figure 5B:
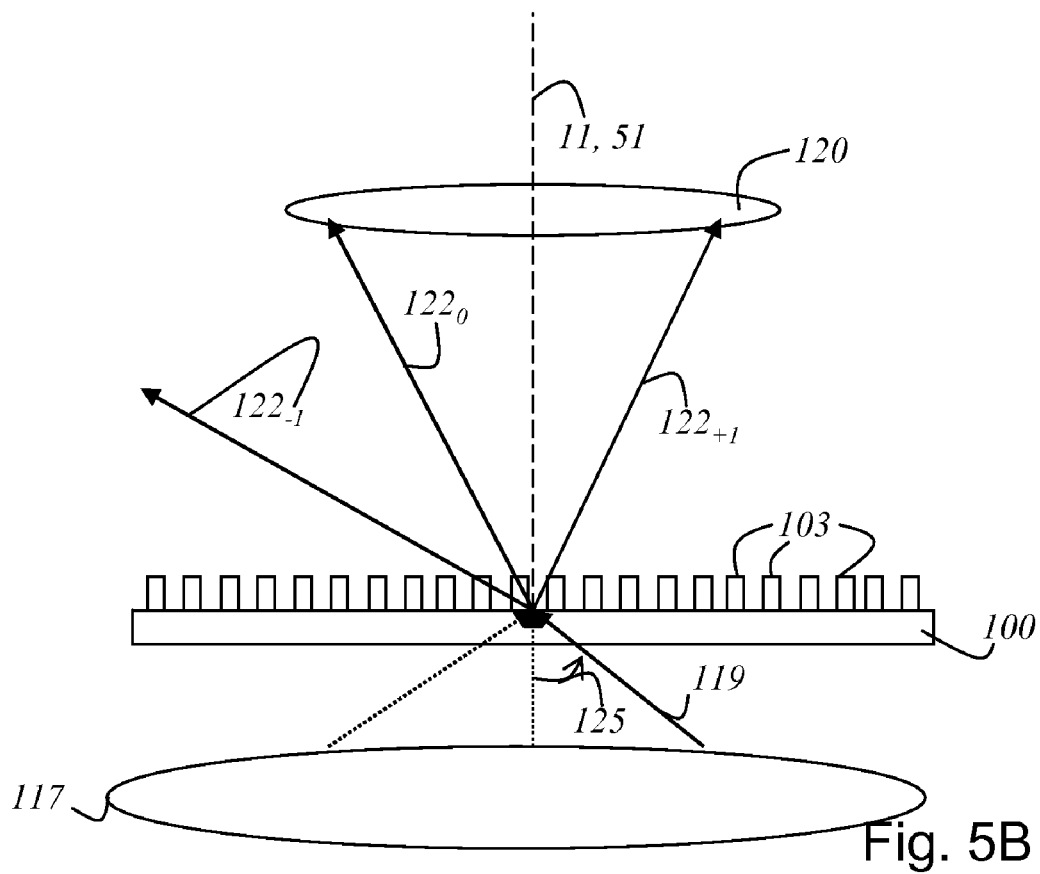
FIG. 5B shows the illumination of a substrate at an angle to the optical axis.

FIG. 5B shows the illumination of substrate 100 with an ideal illumination beam path 119 directed at an angle 125 to optical axis 11, 51 onto substrate 100.

As a general rule, the illumination always has a certain range of angles determined by the lamp, the collector and the condenser (lens). This range of angles is indicated with broken lines in FIGS. 5A and 5B. The annular aperture structure 110 thus results in an oblique illumination which radiates symmetrical to the optical axis from various directions. Providing a suitable width is chosen for the annular outer area 112, the zero order of diffraction $122_0$ and the first order of diffraction $122_{+1}$ are symmetrical to optical axis 11, 51. As a result, the phase relationship between the wave fronts involved in imaging is more constant in the case of defocusing than in conventional illumination, resulting in an enhanced depth of focus. As mentioned above, to achieve optimal conditions for imaging, the radius of the annular aperture structure 110 must be adjusted in accordance with the grid constants or periodicity of structures 103 to be measured on substrate 100.

While this invention has been particularly shown and described with references to preferred embodiments thereof, it will be understood by those skilled in the art that various changes in form and details may be made therein without departing from the scope of the invention encompassed by the appended claims.

What is claimed is:

1. A measuring system for structures on a substrate comprising:
    a substrate for semiconductor manufacture which carries periodic structures;
    a condenser with an entrance pupil;
    an objective, which is arranged above the substrate; and
    an aperture structure is provided in an illumination beam path of the condenser and/or the objective,
    wherein the aperture structure has an opaque circular inner area and a transparent annular outer area, and the aperture structure is selectable according the periodicity of the structures on the substrate so that a width of the transparent annular outer area cause a zero order of diffraction and a first order of diffraction to be symmetrical to an optical axis.

2. The measuring system according to claim 1, wherein the aperture structure is adjustable and/or pivotable, to enable evaluation of a measurement with different apertures.

3. The measuring system according to claim 1, wherein the circular inner area shows a transmission which declines toward the center in accordance with a function and wherein the annular outer area is transparent.

4. The measuring system according to claim 3, wherein the transmission declines toward the center of the circular inner area in accordance with a cosine function.

5. The measuring system according to claim 1, wherein the diameter of the circular inner area and the width of the annular outer area are variable.

6. The measuring system according to claim 1, wherein the aperture structure is formed as an liquid crystal display, with which the diameter of the circular inner area and the width of the annular outer area, as well as the transmission of the inner area can be adjusted, in order to compensate the ratio of diffracted light to undiffracted light on structures to be measured using the adjustable aperture structure.

7. The measuring system according to claim 1, wherein a coherent illumination is provided for illuminating the structures.

8. A method for measuring periodic structures on a substrate for semiconductor manufacture comprising:
    illuminating the periodic structures through an aperture structure positioned in an illumination beam path passing through a condenser with an entrance pupil and/or
    illuminating the periodic structures through an aperture structure positioned in an illumination beam path passing through an objective positioned above the substrate,
    wherein the aperture structure has an opaque circular inner area and a transparent annular outer area and
    wherein the aperture structure is selectable depending on periodicity of the structures on the substrate so that a selected width of the transparent annular outer area results in a zeroth order of diffraction and a first order of diffraction of the illumination of the periodic structures on a substrate being symmetrical with respect to an optical axis orthogonal to the substrate.

* * * * *